July 9, 1968      W. H. COULTER      3,392,331
PARTICLE ANALYZER THRESHOLD LEVEL CONTROL
Original Filed April 6, 1961
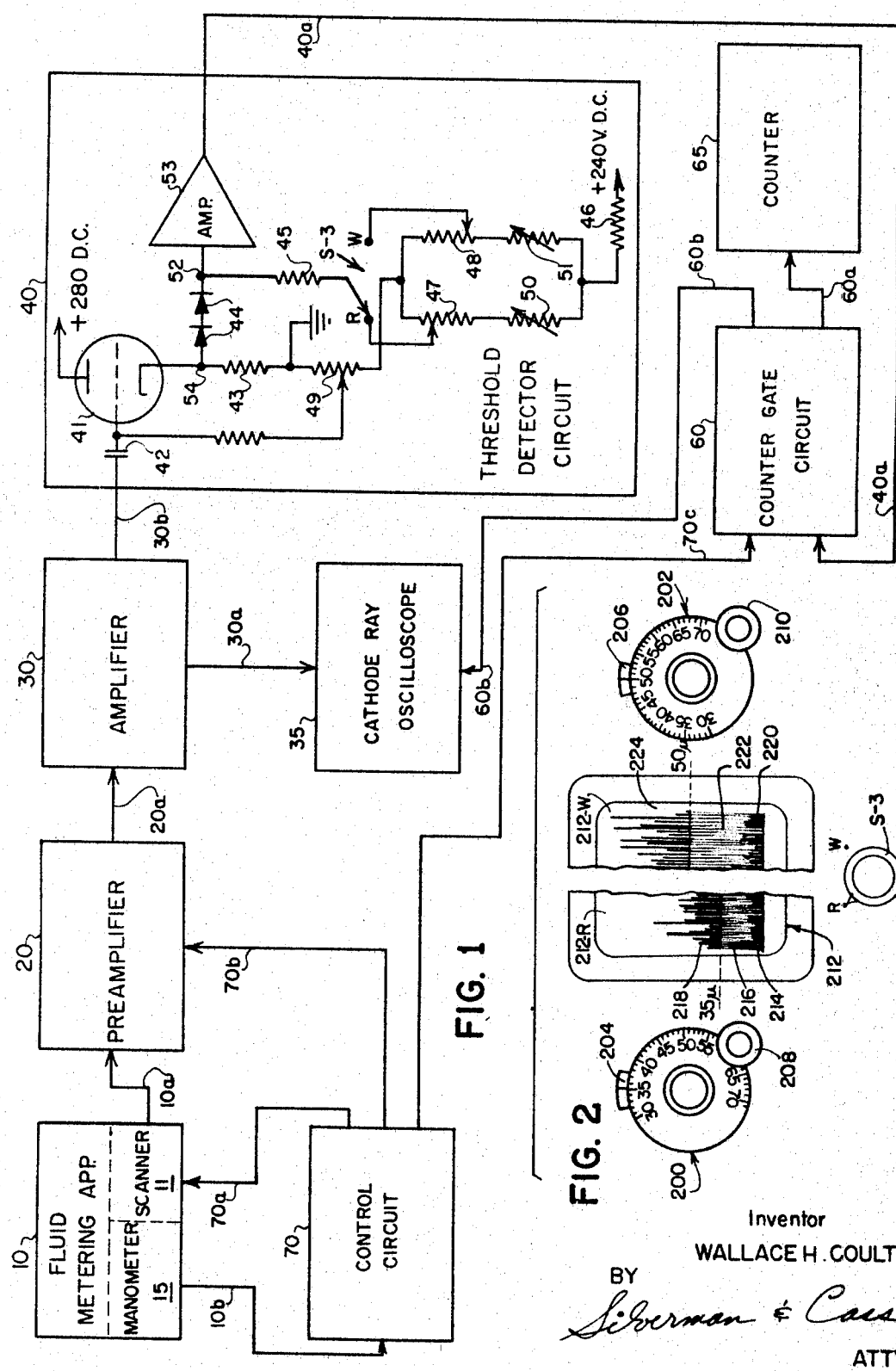
Inventor
WALLACE H. COULTER
BY
*Silverman & Cass*
ATTYS.

United States Patent Office 3,392,331
Patented July 9, 1968

3,392,331
PARTICLE ANALYZER THRESHOLD LEVEL CONTROL
Wallace H. Coulter, Miami Springs, Fla., assignor to Coulter Electronics, Inc., Chicago, Ill.
Original application Apr. 6, 1961, Ser. No. 101,289. Divided and this application Aug. 16, 1965, Ser. No. 479,891
7 Claims. (Cl. 324—71)

This application is a division of application Ser. No. 101,289 filed Apr. 6, 1961, now abandoned.

This invention relates to a circuit for rapidly and accurately changing the threshold level of a particle analyzer incorporating threshold level detector means for determining whether the size of an electric pulse generated by the scanning of a particle exceeds the threshold level.

In many laboratories, technicians of relatively low skill are required to operate particle analyzers and make adjustments in their control settings even though they do not understand their principles of operation and, therefore, the consequences of a mistake. For example, hospital technicians frequently use particle analyzers of the Coulter type to make red blood cell and white blood cell counts. In performing this analysis, the operator must change the threshold level control setting from 35 microns, for red blood cells, to 50 microns, for white blood cells, and then back to 35 microns. Obviously such a procedure increases the probability of obtaining an erroneous analysis.

It is therefore a principal object of this invention to provide economical means for rapidly changing the threshold level of a particle analyzer without affecting its accuracy.

This and other objects and advantages of the invention will be more clearly understood from a detailed description of a preferred embodiment set forth below. The drawings are primarily diagrammatic and symbolic in nature in order to kep the description concise and intelligible, as those skilled in the art are familiar with many of the specific circuits which are suitable for constructing the combinations to be described.

In the drawings in which like or equivalent elements have the same reference numerals:

FIG. 1 is a circuit diagram of a preferred embodiment of the invention incorporated in a Coulter-type particle analyzer adapted for making blood cell studies.

FIG. 2 is a diagrammatic view of a cathode ray oscilloscope display showing two conditions of threshold adjustment capable of being used with the circuit of FIG. 1.

The particle analyzer of FIG. 1 comprises a fluid metering apparatus 10, a preamplifier 20, an amplifier 30, a cathode ray oscilloscope 35, a threshold detector circuit 40, a counter gate circuit 60, a counter 65 and a control circuit 70.

The fluid metering apparatus 10 is a device for metering a predetermined amount of fluid having the particles to be analyzed suspended therein and for generating electrical signal pulses whose parameters are functions of the physical properties of the particles that are passed through the apparatus or scanned. One such fluid metering apparatus is described and claimed in U.S. Patent No. 2,869,078 and the reader is referred to that patent for a complete description of its structure and method of operation.

The fluid metering apparatus 10 comprises two main sections. The first is the scanner 11 which contains transducer means for transforming information on the physical properties of the particles which are scanned into electrical signals which can be analyzed by electronic devices. In this preferred embodiment, the scanner is of the Coulter type. Its structure and method of operation are taught in U.S. Patent No. 2,656,508 and the reader is referred to this patent as well as U.S. Patent No. 2,869,078 where a complete disclosure of the fluid metering apparatus of the preferred embodiment will be found.

The second section of the fluid metering apparatus is the manometer 15. This section provides signals which indicate the beginning and the end of the period in which a carefully metered volume of fluid is being scanned.

The scanner signals, which are functions of the physical properties of the particles which are scanned, are transmitted by channel 10a to the input of the preamplifier 20. The manometer signals, which indicate the beginning and the end of the scanning period, are transmitted to the input of the control circuit 70 by channel 10b. A control signal which causes energizing and de-energizing of the scanner electrodes is transmitted from the control circuit 70 to the scanner 11 by channel 70a.

The preamplifier 20 is designed to amplify the weak signals generated by the scanner and received from channel 10a. Its circuit contains means for biasing its active amplifying element to cut-off in response to a signal received from the control circuit 70 through channel 70b at the end of a scanning period. A complete description of the preamplifier control circuit of the preferred embodiment will be found in my co-pending application Ser. No. 479,907, filed Aug. 16, 1965 and entitled "Particle Analyzer Control Circuit" which is also a division of my application Ser. No. 101,289.

The signals amplified by the preamplifier 20 are transmitted by channel 20a to the input of the amplifier 30.

The amplifier 30 amplifies the relatively low level signals received from channel 20a to a higher level. These high level signals are transmitted to the vertical deflection plates of the cathode ray oscilloscope 35 by channel 30a and to the input of the threshold detector circuit 40 by channel 30b.

The function of the threshold detector circuit 40 is to determine which signal pulses received from channel 30b have amplitudes which exceed a predetermined threshold level and to amplify and transmit those pulses whose amplitudes do exceed the threshold level to other parts of the circuit for further analysis.

It is taught in the patents previously referred to that the Coulter type transducer or scanner will generate a signal pulse having an amplitude which is a function of the volume of a particle which has been scanned by the transducer. Because the predetermined threshold level is directly related to a respective particle volume, it is possible, by use of means for counting the number of pulses which are amplified and transmitted from the output of the threshold detector circuit 40, to determine the number of particles having volumes in excess of the predetermined size.

The threshold detector circuit 40 comprises an amplifier tube 41 connected in a cathode follower configuration to channel 30b through a capacitor 42. The output signals from the cathode follower stage appear across cathode resistor 43 and the detector portion of the circuit which comprises diodes 44 and the threshold level control circuit which incorporates resistors 45 and 46; potentiometers 47, 48 and 49; rheostats 50 and 51 and switch S–3. Signal pulses having amplitudes in excess of the predetermined threshold level appear at junction 52 and are amplified by amplifier 53 for transmission to other parts of the circuit via channel 40a.

The predetermined threshold level signal is obtained by switching the pole of switch S–3 to the appropriate contact, either R (red blood cells) or W (white blood cells) in this embodiment. The switch S–3 connects junction 52, through the resistor 45, to the slider of either the potentiometer 47 or the potentiometer 48.

The potentiometer 47 is connected in a voltage divider circuit with the potentiometer 49, the rheostat 50 and the resistor 46 across the output terminals of a 240 volt D.C.

source. Similarly, the potentiometer 48 is connected in a voltage divider circuit with the potentiometer 49, the rheostat 51 and the resistor 46 across the output terminals of the source.

Because of this circuit arrangement, a positive potential will appear at the junction 52. The slider of the potentiometer 49 is adjusted under "no-signal" conditions so that the base line or reference potential developed across the cathode resistor 43 is at a proper magnitude, which is less positive than that appearing across the junction 52 and ground during quiescent conditions.

In this condition, the diodes 44 are back biased. If a positive signal pulse having an amplitude in excess of the threshold level is transmitted by the channel 30b to the detector circuit 40, the grid of tube 41 will be driven in the positive potential direction, thereby increasing the cathode current. When the potential at junction 54 exceeds the potential at junction 52 by more than the work potential of the diodes 44, the diodes will become forward biased and those portions of the pulse signal envelope having heights in excess of the threshold level will appear at junction 52 and, amplified in level, at channel 40a. Pulses having amplitudes which are less than the threshold level will not cause the diodes 44 to switch into the conduction state and therefore will not appear at channel 40a. In this manner, signal pulses having amplitudes in excess of the threshold level are detected.

The signal pulses appearing at channel 40a are transmitted to the input of the counter gate circuit 60. The counter gate circuit performs two functions. Its first function is to act as a limiter so as to generate constant amplitude output pulses in response to input pulses received from channel 40a. Its second function is to act as a gate so as only to transmit signal pulses to the counter 65 by channel 60a when it receives the proper signal from the control circuit 70 via channel 70c. The counter gate circuit 60 also transmits pulses to the beam intensity circuit of the oscilloscope 35 via channel 60b at all times when a signal is received from channel 40a. In this manner a visually distinguishable threshold level may be displayed on the oscilloscope screen. The counter gate circuit is more fully described in my previously identified application Ser. No. 479,907.

The counter 65 may be any mechanical, electrical or electro-mechanical counter which registers the number of pulses applied to its input circuit via channel 60a.

The control circuit 70, the subject of my copending application Ser. No. 479,907, is programmed to energize the scanner electrodes, reset the counter 65 and close the counter gate circuit 60 in response to an operator command; to signal the counter gate circuit 60 to open at the beginning of an analytic run of scanning a metered volume of fluid; and to de-energize the scanner electrodes at the end of an analytic run.

Attention is now invited to the means for enabling the operator of the analyzer to establish two separate threshold levels and to switch from one to the other rapidly. The control knob of the switch S-3 is shown at the bottom of FIG. 2. It may be seen that the knob may be moved between the two positions R and W. The potentiometer 47 has its slider driven by a control knob 200 mounted on the exterior of the panel of the housing for the analyzer while the potentiometer 48 has a similar control knob 202 which is similarly mounted. Each of these knobs has a scale along its edge which cooperates with an index mark fixed to the panel as shown at 204 and 206 respectively. Each knob is locked into position, if desired, by means of a simple locking device shown at 208 and 210 respectively. Also in FIG. 2 there is illustrated in somewhat diagrammatic form the face of the cathode ray oscilloscope 35 which has been broken into two parts to show two conditions of operation. The cathode ray oscilloscope face is designated 212 and in order to distinguish between the two conditions, the left side is designated 212-R and the right side is designated 212-W. These two conditions represent the response of the analyzer to the two positions of the switch S-3.

In counting and sizing blood cells, for example, the average volume of the red cells has been found to be on the order of 80 cubic microns. In order to avoid the counting of debris and to prevent the inherent noise of the circuit from causing spurious counts, the threshold level for counting red blood cells should be set at a value which will pass only those particles whose volumes exceed 35 cubic microns. Therefore, the switch S-3 is set to the R position in which the potentiometer 47 is connected into the detector circuit. The knob 200 is moved to the index location designated as 35 cubic microns and locked in this position by the locking device 208, potentiometer 49 and rheostat 50 having been previously calibrated.

When a suspension of red blood cells is scanned by the fluid metering apparatus 10, a trace similar to that shown at 212-R will appear on the face of the oscilloscope 35. The debris and noise is represented by what is called "hash" at the bottom of the trace as shown at 214. In the area 216, the trace of the bottoms of the pulses will be dimly visible as this represents pulse heights which are functions of particle sizes below 35 cubic microns. In the area 218, the trace of the upper portions of the pulses will be brightly visible as this represents pulse heights which are functions of particle sizes in excess of 35 microns. Thus the threshold level, here 35 cubic microns in particle size, above which particles will be counted is visually distinguishable to the operator.

When white cells are to be counted, the control knob of switch S-3 is placed in the W position. The potentiometer 48 is now connected into the circuit instead of the potentiometer 47. The knob 202 is rotated to bring any desired value of the threshold level calibrations to the index mark 206. In FIG. 2 this value has been chosen as 50 cubic microns.

For counting white blood cells, the preferred threshold level represents a particle volume of 50 cubic microns since most of the cells have a volume in excess of 80 cubic microns.

When a suspension of white blood cells is scanned by the fluid metering apparatus 10, a trace similar to that shown at 212-W will appear on the face of the oscilloscope 35. Most techniques for the counting and the sizing of white blood cells require the breaking down of the red blood cells so that there is a substantially greater amount of debris than is found present in red blood cell studies. The hash caused by this debris is shown at 220. The dimly visible portions of the trace are designated by the reference numeral 222 while the brightly visible portion of the trace above the 50 cubic micron threshold level is designated by the reference numeral 224.

Where the apparatus of the invention is used primarily for the counting of two kinds of particles such as red and white blood cells, the continuously variable threshold level controls 200 and 202 may be preset and locked in place by the chief technician. After this, analytic runs may be made by others of lower skill who may effect a change in threshold level by merely operating the switch S-3. This provision not only reduces the likelihood of making an erroneous analysis but provides means for reducing the time required to obtain a count. Since the fluid metering apparatus 10 need not be servcied between analytic runs, it will be appreciated that red and white blood cell determinations may be made quickly and in random order, the technician being required only to operate the switch S-3 to change the threshold level instead of adjusting a control knob such as 200. This arrangement also is suitable for use in other fields where different sizes of particles are studied.

It is believed that the invention is sufficiently described to enable those skilled in the art to understand its structure, purpose and method of operation. Obvious variations and changes in the circuitry and structure, such as the use of transistors, are capable of being made without departing from the spirit or the scope of the invention as defined in the claims.

What it is desired to claim by Letters Patent of the United States is:

1. In combination:
   a particle scanning apparatus generating a discrete signal for each particle scanned,
   each said signal having a parameter which is a function of a physical property of a respective scanned particle, and
   a threshold detector circuit coupled to said scanning apparatus and receiving each of said signals,
   said detector circuit having a biasable detector portion coupled to receive all of said signals,
   said detector circuit also having a first and a second threshold determining means coupled to said detector portion for at any one time biasing said portion by a threshold level developed by either one of said threshold determining means,
   said first and second threshold determining means being electrically parallel to one another and further comprising,
   a common power source coupled to the parallel means, and
   said detector portion further having an output from which passes a response only to each said signal having said parameter of sufficient magnitude to override the bias applied to said detector portion by said one threshold means.

2. In a particle analyzing apparatus combining:
   particle scanning means which generates scanning signals each having a parameter which is a function of a physical characteristic of a respective scanned particle,
   threshold detector circuitry which receives all said scanning signals but transduces only those scanning signals which exceed a predetermined threshold level and thus represent scanned particles having a desired physical characteristic, and
   means responsive to transduced signals for further aiding in the particle analysis, the improvement residing in the threshold detector circuitry and comprising:
   a unidirectionally conductive detector portion coupled to receive discrete inputs representative of said scanning signals,
   a plurality of biasing circuits each developing a discrete magnitude of bias of finite difference, each said discrete bias having a magnitude sufficient to reverse bias said detector portion by a predetermined threshold level and block transduction of all scanning signals except those whose representative discrete inputs are of a nature to overcome the discrete bias and exceed the predetermined threshold level,
   said biasing circuits being electrically and operationally independent from one another and being coupled in parallel through opposite terminals of a common voltage source, and
   selecting means coupled to said detector portion and discretely connectable to any one of said biasing circuits at any one time for presenting to said detector portion one predetermined threshold level.

3. An improved threshold detector circuit for use with particle analyzing apparatus and the like which generate a plurality of pulses of differing amplitude which said threshold detector circuit receives and transduces only said pulses having an amplitude in excess of a predeterminable threshold value comprising:
   a biasable detector portion positioned to receive discrete signals of varying amplitude representative of each said pulse,
   a plurality of bias circuits for applying to said detector portion a plurality of bias thresholds of predetermined values,
   said bias circuits being similar to one another and containing mechanically variable impedance means,
   said bias circuits being electrically independent from one another during operation thereof, and
   threshold bias selecting means connected between said detector portion and said bias circuits and at any one time coupling any one of said bias circuits to said detector portion.

4. An improved threshold detector circuit as defined in claim 3 further comprising:
   manually regulated means coupled to at least one of said mechanically variable impedance means such that regulation thereof is mutually independent of one another and said selecting means.

5. An improved threshold detector circuit for use with particle analyzing apparatus and the like which generate a plurality of pulses of differing amplitude which said threshold detector circuit receives and transduces only said pulses having an amplitude in excess of a predeterminable threshold value comprising:
   a biasable detector portion positioned to receive discrete signals of varying amplitude representative of each said pulse,
   a plurality of bias circuits for applying to said detector portion a plurality of bias thresholds of predetermined values, and
   threshold bias selecting means connected between said detector portion and said bias circuits and at any one time coupling any one of said bias circuits to said detector portion,
   said detector portion having a pair of opposite ends, one of which is connected to said selecting means, and further comprising,
   a cathode follower circuit connected to the other end of said detector portion,
   said pulses being received by said cathode follower circuit which generates and applies said signals to the other end of said detector portion.

6. An improved threshold detector circuit as defined in claim 5 in which:
   said detector portion comprises diode means poled for forward conduction toward said one end thereof such that only signals received at said other end thereof and of an amplitude in excess of the threshold value being applied at that time are transduced.

7. An improved threshold detector circuit for use with particle analyzing apparatus and the like which generate a plurality of pulses of differing amplitude which said threshold detector circuit receives and transduces only said pulses having an amplitude in excess of a predeterminable threshold value comprising:
   a bisable detector portion positioned to receive discrete signals of varying amplitude representative of each said pulse,
   a plurality of bias circuits for applying to said detector portion a plurality of bias thresholds of predetermined values,
   said bias circuits being coupled in parallel to one another through connection with opposite terminals of a common voltage source,
   said detector portion comprising electrically passive, unidirectional conduction means, and
   threshold bias selecting means connected between said detector portion and said bias circuits and at any one time coupling any one of said bias circuits to said detector portion.

References Cited

UNITED STATES PATENTS

| | | | |
|---|---|---|---|
| 2,752,589 | 6/1956 | DeLong | 340—253 |
| 3,127,505 | 3/1964 | Gustavson | 324—71 |

(Other references on following page)

OTHER REFERENCES

Gucker et al., J. Colloid Science; vol. 4, 1949 (QD 549.J69), pp. 541–560, Berg, Robert H., ASTM Special Technical Pub. No. 234, 324–71PC; Symposium on Particle Size Measurement (TA406.7 A5(1958), pp. 245–258. Published by the Amer. Soc. for Testing Materials, 1916 Race St., Philadelphia 3, Pa., presented at the Sixty-First Annual Meeting of the Amer. Soc. of Testing Materials, Boston, Mass., June 1958.

RUDOLPH V. ROLINEC, *Primary Examiner.*

WALTER L. CARLSON, *Examiner.*

C. F. ROBERTS, *Assistant Examiner.*